United States Patent
Marcuccilli et al.

(10) Patent No.: US 8,948,495 B2
(45) Date of Patent: Feb. 3, 2015

(54) INSPECTING A WAFER AND/OR PREDICTING ONE OR MORE CHARACTERISTICS OF A DEVICE BEING FORMED ON A WAFER

(71) Applicant: KLA-Tencor Corporation, Milpitas, CA (US)

(72) Inventors: Gino Marcuccilli, Glasgow (GB); Amir Widmann, Sunnyvale, CA (US); Ellis Chang, Saratoga, CA (US); John Robinson, Austin, TX (US); Allen Park, San Jose, CA (US)

(73) Assignee: KLA-Tencor Corp., Milpitas, CA (US)

( * ) Notice: Subject to any disclaimer, the term of this patent is extended or adjusted under 35 U.S.C. 154(b) by 150 days.

(21) Appl. No.: 13/783,291

(22) Filed: Mar. 2, 2013

(65) Prior Publication Data
US 2014/0037187 A1    Feb. 6, 2014

Related U.S. Application Data

(60) Provisional application No. 61/678,576, filed on Aug. 1, 2012.

(51) Int. Cl.
*G06K 9/00* (2006.01)
*G06T 7/00* (2006.01)

(52) U.S. Cl.
CPC ............... *G06T 7/0004* (2013.01); *G06T 7/001* (2013.01); *G06T 2207/10061* (2013.01); *G06T 2207/30148* (2013.01)
USPC ....................................................... 382/149

(58) Field of Classification Search
USPC ............... 257/620, E21.023, E21.03, E21.24, 257/E21.524, E23.179; 382/149; 378/34
See application file for complete search history.

(56) References Cited

U.S. PATENT DOCUMENTS

| | | | |
|---|---|---|---|
| 6,020,957 A | 2/2000 | Rosengaus et al. | |
| 6,215,896 B1 * | 4/2001 | Greig et al. | 382/149 |
| 6,902,855 B2 | 6/2005 | Peterson et al. | |
| 6,910,203 B2 * | 6/2005 | Kokjohn | 430/30 |
| 7,418,124 B2 | 8/2008 | Peterson et al. | |
| 7,570,796 B2 | 8/2009 | Zafar et al. | |
| 7,729,529 B2 | 6/2010 | Wu et al. | |
| 7,769,225 B2 | 8/2010 | Kekare et al. | |
| 8,041,106 B2 | 10/2011 | Pak et al. | |
| 8,111,900 B2 | 2/2012 | Wu et al. | |
| 2004/0032581 A1 | 2/2004 | Nikoonahad et al. | |
| 2008/0252870 A1 * | 10/2008 | Jeunink et al. | 355/53 |
| 2008/0304025 A1 * | 12/2008 | Chang et al. | 355/30 |
| 2010/0323171 A1 | 12/2010 | Doytcheva et al. | |
| 2011/0085179 A1 | 4/2011 | Mann et al. | |
| 2012/0123581 A1 | 5/2012 | Smilde et al. | |

OTHER PUBLICATIONS

International Search Report and Written Opinion for PCT/US2013/053252 mailed on Nov. 13, 2013.

* cited by examiner

*Primary Examiner* — Gregory F Cunningham
(74) *Attorney, Agent, or Firm* — Ann Marie Mewherter

(57) ABSTRACT

Methods for inspecting a wafer and/or predicting one or more characteristics of a device being formed on a wafer are provided. One method includes acquiring images for multiple die printed on a wafer, each of which is printed by performing a double patterning lithography process on the wafer and which include two or more die printed at nominal values of overlay for the double patterning lithography process and one or more die printed at modulated values of the overlay; comparing the images acquired for the multiple die printed at the nominal values to the images acquired for the multiple die printed at the modulated values; and detecting defects in the multiple die printed at the modulated values based on results of the comparing step.

37 Claims, 3 Drawing Sheets

INSPECTING A WAFER AND/OR PREDICTING ONE OR MORE CHARACTERISTICS OF A DEVICE BEING FORMED ON A WAFER

BACKGROUND OF THE INVENTION

1. Field of the Invention

This invention generally relates to methods for inspecting a wafer and/or predicting one or more characteristics of a device being formed on a wafer.

2. Description of the Related Art

The following description and examples are not admitted to be prior art by virtue of their inclusion in this section.

Fabricating semiconductor devices such as integrated circuits involves forming multiple layers on a wafer. Different structures are formed on different layers of the wafer, and some structures on different layers are intended to be electrically connected to each other while other structures on different layers are intended to be insulated from one another. If the structures on one layer are not properly aligned with other structures of other layers, the misalignment of the structures can prevent the proper electrical connection of some structures and/or the proper insulation for other structures. Therefore, measuring and controlling the alignment of multiple layers on a wafer is important in the successful manufacture of working semiconductor devices.

Generally, the alignment of one layer to another layer on a wafer is determined by the alignment of the wafer in an exposure step of a lithography process performed on the wafer. In particular, since the lithography process involves forming patterned features in a resist material that are then transferred to a device material using other fabrication processes, the lithography process generally controls where the patterned features (and therefore where device structures formed from the patterned features) are formed on the wafer. Therefore, measuring and controlling alignment of the wafer and thereby overlay of features on one layer with respect to features on another layer before, during, and/or after the lithography process is a critical step in the fabrication process.

Parameters of the lithography process other than overlay also affect the resulting patterned features formed on the wafer. For example, the focus and dose of the exposure tool used in the lithography process can affect various characteristics of the patterned features such as critical dimension, side wall angle, and height. If the patterned features are not formed within specifications for such characteristics, device structures formed from the patterned features may not be properly insulated from one another or properly connected with one another. In addition, such characteristics can also affect electrical characteristics of devices formed on the wafer. Therefore, it is important to monitor and control multiple parameters of the lithography process to ensure that working devices are fabricated and also to ensure that devices having suitable functionality are fabricated.

Accordingly, it would be advantageous to develop systems and/or methods that can be used to improve the devices fabricated on wafers by eliminating design problems before the devices are fabricated and monitoring and controlling the lithography process.

SUMMARY OF THE INVENTION

The following description of various embodiments is not to be construed in any way as limiting the subject matter of the appended claims.

One embodiment relates to a method for inspecting a wafer. The method includes acquiring images for multiple die printed on a wafer. Each of the multiple die is printed by performing a double patterning lithography process on the wafer. The multiple die include two or more die printed at nominal values of overlay for the double patterning lithography process and one or more die printed at modulated values of the overlay. The method also includes comparing the images acquired for the multiple die printed at the nominal values to the images acquired for the multiple die printed at the modulated values. In addition, the method includes detecting defects in the multiple die printed at the modulated values based on results of the comparing step.

Another embodiment relates to a method for predicting one or more characteristics of a device being formed on a wafer. The method includes performing metrology on one or more die formed on a wafer using a lithography process. The method also includes determining overlay errors, focus errors, dose errors, or some combination thereof of the lithography process in the one or more die based on results of the metrology. In addition, the method includes simulating one or more characteristics, such as contour, of a device being formed from the one or more die by applying the overlay errors, focus errors, dose errors, or some combination thereof to design data for the one or more die.

Each of the steps of the method embodiments described above may be performed as described further herein. The methods described above may include any other step(s) of any other method(s) described herein and may be performed using any of the systems described herein.

BRIEF DESCRIPTION OF THE DRAWINGS

Other objects and advantages of the invention will become apparent upon reading the following detailed description and upon reference to the accompanying drawings in which.

Figure 1:
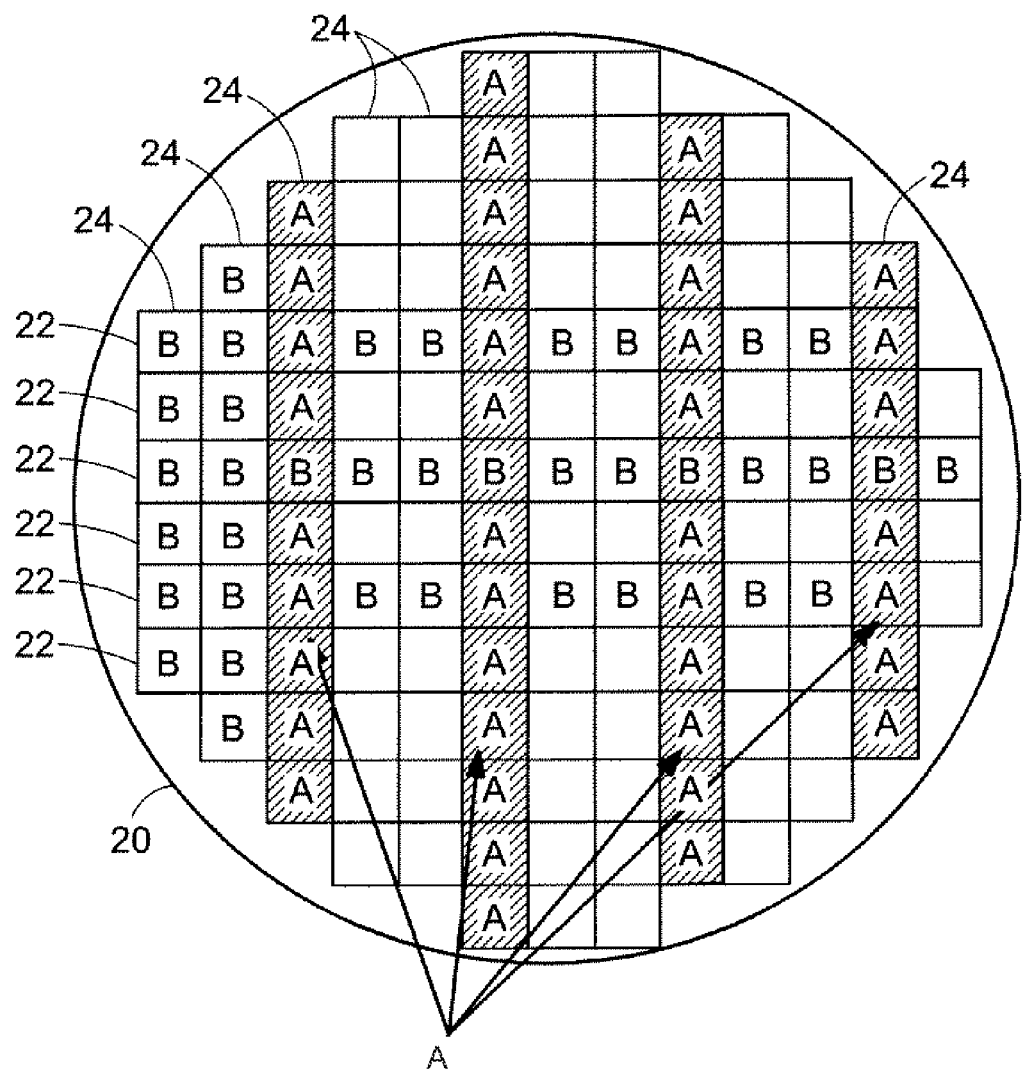
FIG. 1 is a schematic diagram illustrating one embodiment of multiple die printed on a wafer, which include two or more die printed at nominal values of a parameter of a double patterning lithography process and one or more die printed at modulated values of the parameter.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims,

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals.

One embodiment relates to a method for inspecting a wafer. The method includes acquiring images for multiple die printed on a wafer. Each of the multiple die is printed by performing a double patterning lithography (DPL) process on the wafer. A DPL process may involve two separate lithography patterning steps. After each of the lithography patterning steps, an etch process (possibly followed by other process steps) may be performed. The DPL process may also be a process that is included in or is part of a lithography process that includes more than two separate exposures. For example, the lithography process that is performed on the wafer may a triple patterning lithography (TPL) process or a quadruple patterning lithography (QPL) process. In this manner, the term "DPL" process as used herein is intended to mean any multiple pattern lithography (MPL) process that includes at least two separate lithography patterning steps.

The multiple die include two or more die printed at nominal values of overlay for the DPL process and one or more die printed at modulated values of the overlay. In this manner, the embodiments described herein make use of the intentional modulation of the overlay from die to die (or field to field) with the purpose of intentionally causing defects as the reticle overlay error increases.

One embodiment of a layout of multiple die on a wafer is shown in FIG. 1. As shown in FIG. 1, the multiple die may be printed on wafer 20 in rows 22 and columns 24. As further shown in FIG. 1, the wafer may include two columns of "B" die for every column of "A" die. The "B" die are printed at nominal values of the overlay, and the "A" die are printed at modulated values of the overlay. Therefore, each of the "B" die on the wafer may be printed at the same values In addition, each of the "A" die in any one column may be printed at different values of the overlay from each other. In this manner, the values of overlay may be modulated from row to row on the wafer. The overlay values may be modulated in any suitable increments, and the range of the modulated overlay values may vary depending on, for example, the number of modulated die that can be printed on the wafer. The overlay may be modulated in the x and y direction. For example, modulated values of overlay in the x direction may be a nominal value for alignment in the x direction plus some error in the alignment in the x direction. The overlay in the y direction may be modulated in a similar manner.

Acquiring the images for the multiple die may be performed after both exposure steps of the DPL process have been performed on the wafer. In this manner, overlay characterization may be performed after the second exposure of the wafer. Acquiring the images for the multiple die on the wafer may be performed using a broadband patterned wafer defect inspection system such as one of the Bright-Field tools commercially available from KLA-Tencor, Milpitas, Calif., or any other suitable inspection tool known in the art. Acquiring the images for the multiple die may alternatively include acquiring the images from a computer-readable storage medium in which the images have been stored by an image acquisition system. Therefore, acquiring the images may or may not be performed using the wafer. In addition, acquiring the images for the two or more die printed at nominal values of overlay may include simulating how the two or more die would be printed on the wafer at the nominal values or acquiring such simulated images from a computer-readable storage medium. Such images may be simulated in any suitable manner. Therefore, the images for the nominal values may include simulated nominal images or actual nominal images of a wafer on which the multiple die have been printed using an exposure system. As such, simulated nominal images may be used as the image source for the comparison steps described further herein.

The method also includes comparing the images acquired for the multiple die printed at the nominal values to the images acquired for the multiple die printed at the modulated values. Comparing the images in this manner may be performed in any suitable manner. Comparing the images may also include comparing images acquired for one of the die printed at the modulated values to two of the multiple die printed at the nominal values. Alternatively, comparing the images may include comparing images acquired for one of the die printed at the modulated values to only one of the multiple die printed at the nominal values.

The method further includes detecting defects in the multiple die printed at the modulated values based on results of the comparing step. The defects may be detected using any suitable defect detection algorithm and/or method. For example, detecting the defects may include applying a defect detection threshold to results of the comparing step (e.g., the differences between the compared images) and any results found to be above the defect detection threshold may be identified as a defect or a possible defect.

The methods described herein are, therefore, similar to process window qualification (PWQ) inspection procedures such as those described in U.S. Pat. No. 6,902,855 to Peterson et al, U.S. Pat. No. 7,418,124 to Peterson et al, and U.S. Pat. No. 7,769,225 to Kekare et al., which are incorporated by reference as if fully set forth herein. However, unlike the systems and methods described in those patents, the embodiments described herein provide a linkage between the inspection PWQ procedure and overlay measurements. In this manner, the embodiments described herein may include PWQ analysis for overlay performed after a second exposure of a DPL process has been performed on the wafer. After the PWQ analysis for overlay, the wafer may be processed using a final etch procedure, which may be followed by a final characterization step.

In one embodiment, the method includes acquiring images for multiple die printed on another wafer, each of the multiple die on the other wafer is printed by performing the DPL process on the other wafer, and the multiple die on the other wafer include two or more die printed at nominal values of focus and exposure for the DPL process and one or more die printed at modulated values of the focus and exposure. Such an embodiment also includes comparing images acquired for the multiple die printed at the nominal values of the focus and exposure to images acquired for the multiple die printed at the modulated values of the focus and exposure and detecting defects in the multiple die printed at the modulated values of the focus and exposure based on results of the comparing step. The multiple die may be printed on the other wafer in a manner similar to that described above (e.g., with two columns of die printed at nominal values followed by one column of die printed at modulated values). The values of the focus and exposure may be modulated in 0.1 increments from nominal (e.g., if nominal is 0.00, the modulated values may vary from 0.6 to −0.6). The range of the modulated values may vary depending on, for example, the number of die that can be printed on the wafer at the modulated values. In this manner, the embodiments described herein may include PWQ analysis for topography performed after a second exposure of a DPL process has been performed on the wafer. Acquiring the images for the multiple die on the other wafer may be performed using a broadband patterned wafer defect inspection system such as one of the 28xx tools commercially available from KLA-Tencor. Comparing the images and detecting the defects in this embodiment may be performed as described further herein.

In one such embodiment, the method includes comparing the defects detected at substantially the same within die position in the multiple die printed at the modulated values of the focus and exposure and, based on results of comparing the defects and the modulated values of the focus and exposure corresponding to the defects, determining points in a design for the multiple die that are most susceptible to defects due to modulation of the focus and exposure. Comparing the defects detected at substantially the same within die position may be performed to determine if defects are present at substantially the same position within more than one of the modulated die. In this manner, comparing the defects detected at substantially the same within die position may identify defects that occur repeatedly at substantially the same location within a die. Therefore, such defects may be identified as potentially systematic defects. The presence of such defects may indicate that there is a problem with the design at that location (e.g., the design has one or more characteristics that are preventing the design from being printed properly on the wafer). In addition, the modulated values of the focus and exposure corresponding to the potentially systematic defects may indicate which areas in the design are most susceptible to defects due to the modulation of the values. In other words, the modulated values of the focus and exposure corresponding to the potentially systematic defects may indicate how sensitive the design is at the position of the potentially systematic defects. For example, areas in a design at which potentially systematic defects occur at values closer to nominal than other areas in the design may be more susceptible or sensitive to defects than the other areas. These areas may then be identified as the critical areas in the design.

In another such embodiment, the method includes comparing portions of design data proximate positions of the defects, detected in the multiple die printed at the modulated values of the focus and exposure, in design data space, determining if the design data in the portions is at least similar based on results of comparing the portions, binning the defects, detected in the multiple die printed at the modulated values of the focus and exposure, in groups such that the portions of the design data proximate the positions of the defects in each of the groups are at least similar, and determining which of the defects, detected in the multiple die printed at the modulated values of the focus and exposure, are systematic defects based on results of the binning. Therefore, the embodiments may include performing design-based binning on the defects detected by PWQ. Design-based binning may be performed as described in U.S. Pat. No. 7,570,796 to Zafar et al., which is incorporated by reference as if hilly set forth herein. For example, comparing the portions of design data proximate positions of the defects in design data space may include extracting design clips for each of the defects, and the extracted design clips may be determined based on the positions of the defects in design data space. The positions of the defects in design data space may be determined based on results of aligning inspection data in inspection data space to design data in design data space, which may also be performed as described in the above-referenced patent. The comparing step may also include comparing the clips against each of the other clips to determining which of the extracted clips are at least similar. The extracted clips that are at least similar may then be grouped such that all of the extracted clips in any one group are at least similar. The defects corresponding to the extracted clips in any one group may then be binned into a corresponding group. In this manner, the defects in the groups are binned such that the portions of the design data proximate the positions of the defects in each of the groups are at least similar. Since systematic defects will occur repeatedly at similar positions in design data, groups of defects that contain more than a predetermined number of defects may be identified as a group of systematic defects, and each of the defects in such a group may be identified as a systematic defect.

In an additional such embodiment, the method includes identifying problems in patterned features being printed in the multiple die based on the defects detected in the multiple die printed at the modulated values of the focus and exposure. In this manner, overlay metrology may be used to determine print issues in DPL. More specifically, PWQ may be performed to determine the impact of the values of focus and exposure on any topography issues. For example, the defects detected at the modulated values of the focus and exposure can be examined to determine if the defects are defects in the patterned features or topography printed on the wafer. The defects can be examined using the images acquired at the positions of the defects on the wafer or by acquiring new images or information about the defects using a wafer inspection system, a defect review system, or a metrology system. The impact of the modulated values of focus and exposure can be determined based on one or more characteristics of the defects in the patterned features or topography. Such characteristics may include, for example, position, dimensions, side wall angle, and the like of the defective patterned features or topography.

In a further such embodiment, the method includes identifying problems in a design for the multiple die based on the defects detected in the multiple die printed at the modulated values of the focus and exposure. In this manner, PWQ may be performed to determine the impact of the values of focus and exposure on any design issues. For example, the defects detected at the modulated values of the focus and exposure can be used in any suitable manner to determine if the defects are caused by problems or issues in the design being printed on the wafer.

In one embodiment, the method includes determining a process window for the DPL process based on the defects. For example, the method may include the determination of the process window with respect to the overlay errors for the design of the full field. Determining the weak areas in the exposure of double patterning designs as described further herein will allow the determination of the process window. Determining the process window may include, for example, determining at which of the modulated values of overlay the patterned features on the wafer are printed with acceptable characteristics (e.g., characteristics filling within predetermined specifications for the patterned features) and defining the process window to include those modulated values of overlay while excluding other modulated values of overlay.

In another embodiment, the defects include systematic defects caused by modulated values of the overlay. In this manner, the method may be used for determining the overlay influenced systematic defectively within DPL. For example, bright field (BF) inspection tools such as that described further herein may be used to inspect the wafer to allow the detection of systematic defects. In particular, systematic defects may be identified as those defects that appear at substantially the same location within multiple modulated die printed on the wafer. In contrast to the embodiments described herein, currently used methods rely on the measurement of the targets in the field to calculate the alignment performance, and the alignment margin is based on design simulations.

In one embodiment, the method includes comparing portions of design data proximate positions of the defects in design data space, determining if the design data in the portions is at least similar based on results of comparing the portions, binning the defects in groups such that the portions of the design data proximate the positions of the defects in each of the groups are at least similar, and determining which of the defects are systematic defects based on results of the binning. In this manner, the embodiments described herein may perform design based binning on the defects detected by overlay modulation. Design based binning may be performed as described further herein.

In one such embodiment, the method includes generating a pareto chart illustrating the number of defects binned into two or more of the pattern groups. In the pareto chart, the different groups into which defects were binned may be identified along the x axis, and the number of defects binned into each group may be illustrated along the y axis. In this manner, the pareto chart may be used to identify the groups (and therefore the corresponding portion of the design and/or die or field) at which defects occur most frequently. That information may then be used to perform other steps described herein such as generating an inspection process, altering a design for the wafer, etc.

In another embodiment, the method includes comparing the defects detected at substantially the same within die position in the multiple die printed at the modulated values of the overlay and, based on results of comparing the defects and the modulated values of the overlay corresponding to the defects, determining points in a design for the multiple die that are most susceptible to defects due to modulation of the overlay. These steps may be performed as described above. In this manner, the method may include using wafer inspection procedures for determining the pattern design-related weak points. In particular, the linkage described herein, between inspection (PWQ) procedures and the correlation of overlay measurements, allows the determination of weak positions on individual designs with respect to overlay. The embodiments described herein may be implemented in a mass production fab with the introduction of a new reticle set to determine the weak areas in the exposure of double patterning designs. In this manner, the embodiments may provide feedback on overlay-related design issues. In contrast to the embodiments described herein, currently used methods do not take into consideration any design errors within the field that may lead to a catastrophic failure as these can only be detected with wafer inspection procedures. These will also be influenced by overlay errors in DPL.

In one such embodiment, the method includes determining an impact of the modulation of the overlay on the points in the design that are most susceptible to the defects. In this manner, the embodiments described herein may be used to determine the impact of the overlay modulation on the marginal areas of the field. The impact of the overlay modulation on the points that are most susceptible to the defects may be determined as described further herein.

In some embodiments, the method includes determining one or more characteristics of one or more reticles used in the DPL process based on the defects. For example, the layout and inspection used in embodiments described herein allow the characterization of double patterned reticles. The characterization of the reticle(s) may include determining if the features were printed within specification on the reticle(s). For example, the areas in the die or field in which systematic defects are determined to occur may be used to identify the corresponding areas in the reticle(s), which may then be identified as possibly problematic areas of the reticle. Those areas of the reticle may then be examined further (e.g., by reticle inspection) to determine if problems exist in those areas that may not have been detected by reticle inspection during qualification of the reticle(s).

In another embodiment, the method includes altering one or more parameters of the DPL process based on the defects. For example, the method may include altering the nominal values of overlay used for the DPL process. In one such example, the process window determined as described further herein may be different than an initial process window set up for the DPL process. If the two process windows are different, the process window determined as described herein may be used as the process window for the DPL and nominal values may be set as the values of overlay in (or near) the center of the determined process window.

In some embodiments, the method includes altering one or more parameters of a control process used for the DPL process based on the defects. For example, determining the weak areas in the exposure of double patterning designs as described further herein will allow the control of the process. The control process that is determined may include the areas on the wafer that are inspected or measured during inspection or metrology used to determine how the DPL process is performing. For example, determining the one or more parameters of the control process may include identifying the areas in the design at which systematic defects were detected or the weak points in the design such that those areas or points can be monitored during the control process. In addition, determining the control process may include determining any other parameters of the inspection or metrology process used for the DPL process. The one or more parameters of the control process that are altered may also include one or more parameters of the feedback control or in situ control techniques that are used for the DPL process.

In a further embodiment, the method includes altering one or more parameters of a design for the multiple die based on the defects. For example, determining the weak areas in the exposure of double patterning designs as described further herein will allow the feedback to the design of any changes that need to be made to the design for future devices.

The comparing and detecting steps described above may be used to characterize the overlay of modulated dies or fields on the wafer. Similar comparing and detecting steps may be performed using the non-modulated dies or fields to characterize the overlay of non-modulated areas on the wafer. For example, in one embodiment, the method includes comparing two or more of the images acquired for the multiple die printed at the nominal values to each other and detecting defects in the multiple die printed at the nominal values based on results of comparing the two or more images acquired for the multiple die printed at the nominal values to each other. In this manner, the method may include an overlay baseline characterization on the non-modulated fields or die. These steps may be performed as described further herein.

In another embodiment, the method includes performing metrology on one or more of the multiple die, determining overlay errors, focus errors, dose errors, or some combination thereof of the DPL process based on results of the metrology, and simulating one or more characteristics of a device being formed from the one or more multiple die by applying the overlay errors, focus errors, dose errors, or some combination thereof to design data for the one or more multiple die. These steps may be performed as described further herein.

Figure 2:
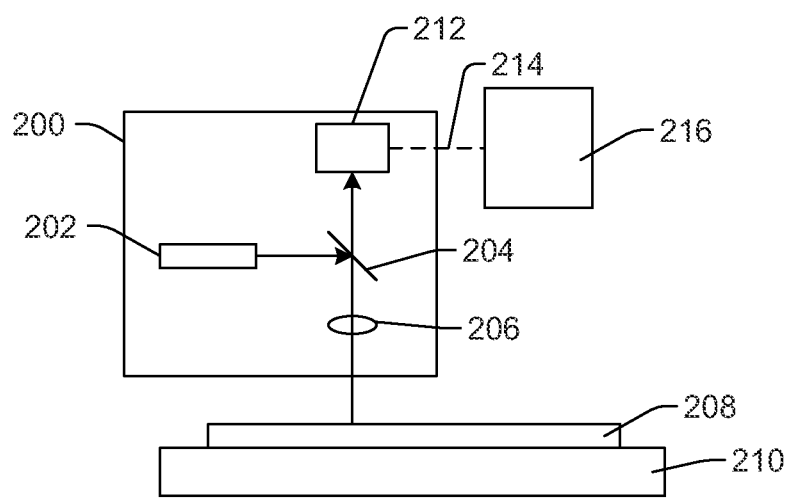
FIG. 2 is a schematic diagram illustrating a side view of one embodiment of a system configured for inspecting a wafer.

FIG. 2 illustrates one embodiment of a system that can be used to inspect a wafer according to any of the embodiments described herein. The system shown in FIG. 2 includes image acquisition subsystem 200 configured to acquire images for multiple die printed on a wafer. The image acquisition subsystem includes light source 202 configured to generate light. The light source may include any suitable light source such as a broadband light source. Light from the light source is directed to beam splitter 204, which is configured to direct light from the light source to refractive optical element 206. Refractive optical element 206 is configured to focus the light from the beam splitter to wafer 208. Wafer 208 is supported and translated by stage 210. Beam splitter 204, refractive optical element 206, and stage 210 may include any suitable such elements known in the art. In addition, although refractive optical element 206 is shown in FIG. 2 as a single refractive optical element, it is to be understood that the refractive optical element may include one or more refractive optical elements and/or one or more reflective optical elements.

Light reflected from the wafer is collected by refractive optical element 206 and is directed through beam splitter 204 to detector 212. The detector is configured to detect the reflected light and to generate images responsive to the reflected light. The detector may include any suitable detector known in the art. The image acquisition subsystem may also include any other suitable optical elements positioned between the light source and the wafer and/or the detector and the wafer. Such optical elements may include wavelength filters, spatial filters, polarizers, analyzers, and the like. The system may include transmission medium 214 that couples detector 212 to computer subsystem 216 such that the computer subsystem can receive the images generated by the detector.

The computer subsystem may be configured as a computer system described herein that is used to performed various steps of the methods described herein. For example, acquiring the images for the multiple die printed on the wafer, comparing the images, and detecting the defects are performed using a computer system. The computer system may include any suitable computer system known in the art. For example, the computer system may take various forms, including a personal computer system, mainframe computer system, workstation, image computer, parallel processor, or any other device known in the art. In general, the term "computer system" may be broadly defined to encompass any device having one or more processors, which executes instructions from a memory medium. The system shown in FIG. 2 may be further configured as described herein.

All of the methods described herein may include storing results of one or more steps of the methods in a storage medium. The results may include any of the results described herein and may be stored in any manner known in the art. The storage medium may include any suitable non-transitory computer-readable storage medium known in the art. After the results have been stored, the results can be accessed in the storage medium and used by any of the method or system embodiments described herein, formatted for display to a user, used by another software module, method, or system, etc.

Figure 3:
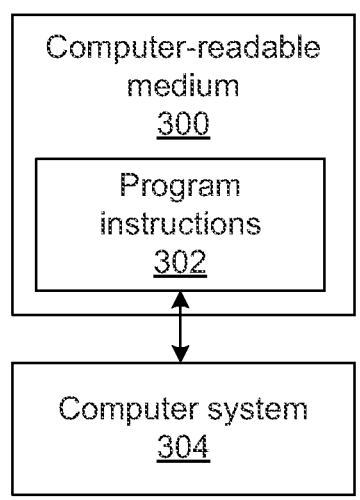
FIG. 3 is a block diagram illustrating one embodiment of a non-transitory computer-readable medium storing program instructions executable on a computer system for performing one or more methods described herein.

FIG. 3 illustrates one embodiment of non-transitory computer-readable medium 300 storing program instructions 302 executable on computer system 304 for performing a method. The method for which program instructions 302 are executable on computer system 304 may include any step(s) of any method(s) described herein. In some embodiments, computer system 304 may be coupled to an image acquisition subsystem or may be a computer subsystem of an inspection or metrology system as described further herein. However, in other embodiments, computer system 304 may not be coupled to or included in an image acquisition subsystem, inspection system, or metrology system, in some such embodiments, computer system 304 may be configured as a stand alone computer system. Computer-readable medium 300, program instructions 302, and computer system 304 may be further configured as described herein.

Program instructions 302 implementing methods such as those described herein may be stored on computer-readable medium 300. The computer-readable medium may be a storage medium such as a read-only memory, a random access memory, a magnetic or optical disk, a magnetic tape, or other non-transitory computer-readable medium.

The program instructions may be implemented in any of various ways, including procedure-based techniques, component-based techniques, and/or object-oriented techniques, among others. For example, the program instructions may be implemented using ActiveX controls, C++ Objects, JavaBeans, Microsoft Foundation Classes ("MFC"), or other technologies or methodologies, as desired.

Another embodiment relates to a method for predicting one or more characteristics of a device being formed on a wafer. The method includes performing metrology on one or more die formed on a wafer using a lithography process. The metrology may be performed using one or several metrology tools, with one or several metrology sensors, either integrated or stand alone. The metrology may include any suitable metrology known in the art, and the lithography process may include any lithography process described herein or any other suitable lithography process known in the art.

The method also includes determining overlay errors, focus errors, dose errors, or some combination thereof of the lithography process in the one or more die based on results of the metrology. For example, the results of the metrology may include a line width of features formed in the one or more die, and based on the line width, the overlay errors, focus errors, dose errors, or some combination thereof that were used to form the patterned features with such a line width may be determined based on experimental results (or using a model) that correlate line width to overlay errors, focus errors, dose errors, or some combination thereof.

The method further includes simulating one or more characteristics of a device being formed from the one or more die by applying the overlay errors, focus errors, dose errors, or some combination thereof to design data for the one or more die. For example, the simulating step may include applying modeled overlay, focus, and dose on a polygon file for the device to simulate real device fluctuations. In this manner, the embodiments described herein may apply real wafer overlay, focus, and dose data to GDS design layout either partially sampled or full layer coverage. For example, the simulating step may include taking the information available from metrology tools including overlay and CD at specific sites, modeled results from K-T Analyzer, which is commercially available from KLA-Tencor, overlay correctables, focus/profile correctables, and dose/CD correctables and applying that information together or individually on specific polygons in the GDS.

In contrast to the embodiments described herein, currently used methods are completely separate for overlay and CD. In overlay, the metrology results are modeled via regression. The modeled results are used to correct the scanner and for disposition of the wafer. The CD process window is analyzed separately and is generally used for linear wafer/lot average dose correction and disposition. In addition, the currently used methods treat all of the pattern elements equally and apply one model across the field separately for overlay, focus, and dose. This does not allow driving a decision based on real behavior under the current process window.

Determining the overlay errors, focus errors, dose errors, or some combination thereof and simulating the one or more characteristics are performed using a computer system, which may be configured as described further herein. In addition, an automated software/hardware solution may be used to link metrology systems. GDS systems, etc. such that various steps described herein can be performed more efficiently.

In one embodiment, the method includes determining a sensitivity of the one or more characteristics of the device to the overlay errors, focus errors, dose errors, or some combination thereof. For example, by applying the models on the design, the areas that are critical device areas can be identified. In this manner, the embodiments described herein can be used to discover and monitor critical pattern related issues.

In another embodiment, the method includes determining one or more positions of one or more metrology targets to be formed on other wafers using the lithography process based on sensitivity of the one or more characteristics of the device to the overlay errors, focus errors, dose errors, or some combination thereof. For example, the one or more positions of the one or more metrology targets may be located in or near the areas that have a higher sensitivity to the overlay errors, focus errors, dose errors, or some combination thereof than other areas of the device. In other words, the metrology targets may be placed in areas where the sensitivity of the device is larger. In this manner, an advantage of the embodiments described herein is that monitoring in high priority areas where risk to the device is higher can be used to make sure that the process is well within the process window.

In contrast to the embodiments described herein, the currently used methods place overlay targets in/on the reticle either at the edges or in the middle of the exposure field without the intention of monitoring a specific area in the exposure field. The 4-6 overlay targets across the field are used to model the overlay across the exposure field. Such an approach averages the overlay across relatively large areas using modeling methodology.

In some embodiments, the method includes dispositioning the wafer based on the one or more characteristics of the device. Dispositioning the wafer includes determining what should be done with the wafer. For example, based on the one or more characteristics of the device, it can be determined that further production can be performed on the wafer if the one or more device characteristics are acceptable (e.g., within specification) or that the wafer should be scrapped or re-worked if the one or more device characteristics are not acceptable.

In another embodiment, the simulating step includes resizing individual polygons in the design data based on the overlay errors, focus errors, dose errors, or some combination thereof to determine areas in the design data that may have one or more failure mechanisms due to the overlay errors, focus errors, dose errors, or some combination thereof. For example, the individual polygons of a GDS design layout may be resized to determine critical areas that may have open, short, or other failure mechanisms. In addition, the role of lithographic simulation may be considered in this application. For example, rather than geometric considerations, the impact via physical simulation may be considered. In particular, after adjusting the design layout, an existing OPC simulation, not just an overlay model, may be applied to the adjusted design layout. In this manner, every stage of process modeling can be used or captured.

In a further embodiment, the method includes predicting yield of a fabrication process that includes the lithography process based on the one or more characteristics of the device, and predicting the yield is performed in-line. For example, the outcome of applying the models on the design will indicate yield problems. In addition, the simulated one or more characteristics of the device may be used for in-line yield prediction. Furthermore, the embodiments described herein enable better in-line yield prediction after overlay, focus, and dose measurement. For example, the embodiments described herein allow better in-line yield prediction based on overlay and CD measurements.

In another embodiment, the method includes determining a sampling scheme for the wafer based on the one or more characteristics of the device, and determining the sampling scheme is performed in-line. For example, the simulated one or more characteristics of the device may be used for in-line yield sampling recommendations. In this manner, the embodiments described herein may be used to dynamically augment parametric sampling and modeling. The sampling scheme may be determined for any process such as inspection, defect review, or metrology. In addition, the sampling scheme may be determined such that areas of the device where defects are more likely to occur and cause issues in the one or more characteristics are sampled more heavily than areas of the device where defects are unlikely to cause issues in the one or more device characteristics.

In one embodiment, the method includes determining one or more parameters of an inspection process to be performed on the wafer or other wafers on which the lithography process is performed based on the one or more characteristics of the device. For example, the simulated one or more characteristics of the device may be used for defect inspection recommendations. In particular, determining the one or more parameters of the inspection process may include defining critical areas for wafer inspection (e.g., to optimize recipe sensitivity). In this manner, the embodiments described herein provide better wafer inspection strategy (e.g., when and where to inspect). As such, the outcome of applying the models on the design will drive better wafer inspection strategy. In this manner, the embodiments described herein can be used to develop an optimized wafer inspection recipe.

In some embodiments, the method includes determining one or more parameters of a metrology process to be performed on the wafer or other wafers on which the lithography process is performed based on the one or more characteristics of the device. For example, the simulated one or more characteristics of the device may be used for critical dimension scanning electron microscopy (CDSEM) measurement site recommendations. In addition, the embodiments described herein provide better parametric metrology and CDSEM measurement strategy (when and where to measure). For example, based on the results of the simulating step, areas where the overlay and CD metrology are more critical can be identified and selected as sites to be measured by a metrology process. In this manner, the embodiments described herein may be used to develop an optimized CDSEM measurement recipe.

In one embodiment, the simulating step includes simulating the one or more characteristics of the device by determining overlay correctables, focus correctables, dose correctables, or some combination thereof from the overlay errors, focus errors, dose errors, or some combination thereof, respectively, and applying the overlay correctables, focus correctables, dose correctables, or some combination thereof to the design data for the one or more die. The overlay correctables, focus correctables, dose correctables, or some combination thereof can be determined from the overlay errors, focus errors, dose errors, or some combination thereof, respectively, in any suitable manner. Applying the overlay correctables, focus correctables, dose correctables, or some combination thereof to the design data may be performed as described herein.

In another embodiment, the method includes determining a process window for the design data based on the one or more characteristics and the overlay errors, focus errors, dose errors, or some combination thereof. In this manner, determining a process window may involve a holistic approach that can include simultaneous overlay, focus, dose, bake plate, etc. process windows. In contrast to the embodiments described herein, currently each of these aspects are considered independently (e.g., separate metrology, separate analysis, separate decision making, etc.). In reality, all of the different parameters of the lithography process are linked, so the metrology, analysis, and/or decision making should be linked/coordinated/combined. In this manner, the embodiments described herein may be used to reduce new process development time and improve process ramp time.

In one embodiment, the method includes determining a rework strategy for the wafer or other wafers on which the lithography process is performed based on the one or more characteristics and the overlay errors, focus errors, dose errors, or some combination thereof. For example, based on the analysis of process window over the GDS, a holistic and yield-relevant rework strategy may be developed, which can be a run-time in-spec decision. In this manner, the embodiments described herein may be used for improved rework (to reduce alpha and beta risks). As such, the embodiments described herein may be used to reduce excursion resolution time in the production environment.

In another embodiment, the method includes determining one or more areas in the design data at which the overlay errors, focus errors, dose errors, or some combination thereof are more critical for the one or more characteristics of the device. For example, the method may include identifying areas where the overlay and CD metrology are more critical. In this manner, the embodiments may include discovering and monitoring critical patient related issues.

In one such embodiment, the method includes applying a local model of overlay, dose, and focus to at least one of the one or more areas. For example, the method may include applying a local model of overlay, dose and focus for the identified specific area(s) (e.g., a quadrant of a field). The local model may include any suitable such model. Such an embodiment may also include comparing results of applying the local model to results of applying a global model of overlay, dose, and focus to the design data to determine an accuracy of the global model. For example, a regular (or global) model currently applied can be compared to a local model to verify accuracy of the regular model. The local model can be used for accuracy corrections and adjustments in case the global and local models do not agree.

In one embodiment, the lithography process is a DPL process, the metrology is performed after a first patterning step of the lithography process, and the method includes determining one or more parameters of a second patterning step of the lithography process based on the overlay errors, focus errors, dose errors, or some combination thereof. In this manner, the embodiments described herein may be used to enhance a second printing step of a DPL process based on a first printing step.

In one embodiment, the lithography process is a DPL process, the one or more die include two or more die printed at nominal values of overlay and one or more die printed at modulated values of the overlay, and the method includes acquiring images of at least one of the two or more die printed at the nominal values of the overlay and at least one of the one or more die printed at the modulated values of the overlay, comparing the images acquired for the at least one of the two or more die printed at the nominal values of the overlay to the images acquired for the at least one of the one or more die printed at the modulated values of the overlay, and detecting defects in the one or more die printed at the modulated values based on results of the comparing step. These steps may be performed as described further herein.

Figure 4:
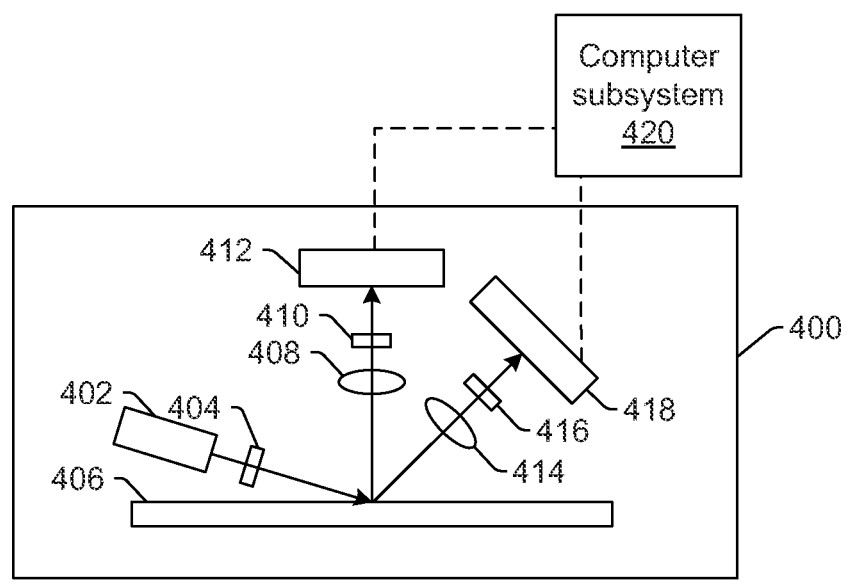
FIG. 4 is a schematic diagram illustrating a side view of one embodiment of a system configured for predicting one or more characteristics of a device being formed on a wafer.

FIG. 4 illustrates one embodiment of a system configured to predict one or more characteristics of a device being formed on a wafer. As shown in FIG. 4, the system includes metrology tool 400 that is configured to perform metrology on one or more die formed on a wafer using a lithography process. The metrology tool includes light source 402. Light source 402 may include any suitable light source known in the art. Light from tight source 402 may be directed through one or more optical elements such as optical element 404, which may be a polarizer. Light exiting the polarizer may be incident on wafer 406 at an oblique angle of incidence.

Light diffracted from the wafer as a result of illumination may be collected by optical element 408, which may be a collector and may include one or more refractive optical elements and/or one or more reflective optical elements. Light exiting optical element 408 may be directed through one or more optical elements such as optical element 410, which may be an analyzer. Light exiting optical element 410 may be directed to detector 412, which may include any suitable detector known in the art. Detector 412 may generate output responsive to the diffracted light detected by the detector.

Light diffracted from the wafer as a result of illumination may also be collected by optical element 414, which may be a collector and may include one or more refractive optical elements and/or one or more reflective optical elements. Light exiting optical element 414 may be directed through one or more optical elements such as optical element 416, which may be an analyzer. Light exiting optical element 416 may be directed to detector 418, which may include any suitable detector known in the art. Detector 418 may generate output responsive to the diffracted light detected by the detector.

The system also includes computer subsystem 420 coupled to the detector(s) such that the computer subsystem can receive the output produced by the detector(s). The is computer subsystem is configured to determine one or more characteristics of the wafer or patterned features on the wafer using output generated by the detector(s) of the metrology subsystem. The computer subsystem may also be configured to perform one or more steps of any of the methods described herein. For example, the computer subsystem may be configured to determine overlay errors, focus errors, dose errors, or some combination thereof of the lithography process in the one or more die based on results of the metrology, as described further herein. The computer subsystem may also be configured to simulate one or more characteristics of a device being formed from the one or more die by applying the overlay errors, focus errors, dose errors, or some combination thereof to design data for the one or more die, as described further herein. The computer subsystem may be further configured as described herein. The system shown in FIG. 4 may be further configured as described herein.

Further modifications and alternative embodiments of various aspects of the invention will be apparent to those skilled in the art in view of this description. For example, methods for inspecting a wafer and/or predicting one or more characteristics of a device being formed on a wafer are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for inspecting a wafer, comprising:
    acquiring images for multiple die printed on a wafer, wherein each of the multiple die is printed by performing a double patterning lithography process on the wafer, and wherein the multiple die comprise two or more die printed at nominal values of overlay for the double patterning lithography process and one or more die printed at modulated values of the overlay;
    comparing the images acquired for the multiple die printed at the nominal values to the images acquired for the multiple die printed at the modulated values; and
    detecting defects in the multiple die printed at the modulated values based on results of said comparing, wherein said acquiring, said comparing, and said detecting are performed using a computer system.

2. The method of claim 1, further comprising acquiring images for multiple die printed on another wafer, wherein each of the multiple die on the other wafer is printed by performing the double patterning lithography process on the other wafer, and wherein the multiple die on the other wafer comprise two or more die printed at nominal values of focus and exposure for the double patterning lithography process and one or more die printed at modulated values of the focus and exposure; comparing images acquired for the multiple die printed at the nominal values of the focus and exposure to images acquired for the multiple die printed at the modulated values of the focus and exposure; and detecting defects in the multiple die printed at the modulated values of the focus and exposure based on results of said comparing.

3. The method of claim 2, further comprising comparing the defects detected at substantially the same within die position in the multiple die printed at the modulated values of the focus and exposure and, based on results of said comparing the defects and the modulated values of the focus and exposure corresponding to the defects, determining points in a design for the multiple die that are most susceptible to defects due to modulation of the focus and exposure.

4. The method of claim 2, further comprising comparing portions of design data proximate positions of the defects, detected in the multiple die printed at the modulated values of the focus and exposure, in design data space, determining if the design data in the portions is at least similar based on results of said comparing the portions, binning the defects, detected in the multiple die printed at the modulated values of the focus and exposure, in groups such that the portions of the design data proximate the positions of the defects in each of the groups are at least similar, and determining which of the defects, detected in the multiple die printed at the modulated values of the focus and exposure, are systematic defects based on results of the binning.

5. The method of claim 2, further comprising identifying problems in patterned features being printed in the multiple die based on the defects detected in the multiple die printed at the modulated values of the focus and exposure.

6. The method of claim 2, further comprising identifying problems in a design for the multiple die based on the defects detected in the multiple die printed at the modulated values of the focus and exposure.

7. The method of claim 1, further comprising determining a process window for the double patterning lithography process based on the defects.

8. The method of claim 1, wherein the defects comprise systematic defects caused by modulation of values of the overlay.

9. The method of claim 1, further comprising comparing portions of design data proximate positions of the defects in design data space, determining if the design data in the portions is at least similar based on results of said comparing the portions, binning the defects in groups such that the portions of the design data proximate the positions of the defects in each of the groups are at least similar, and determining which of the defects are systematic defects based on results of the binning.

10. The method of claim 9, further comprising generating a pareto chart illustrating the number of defects binned into two or more of the groups.

11. The method of claim 1, further comprising comparing the defects detected at substantially the same within die position in the multiple die printed at the modulated values of the overlay and, based on results of said comparing the defects and the modulated values of the overlay corresponding to the defects, determining points in a design for the multiple die that are most susceptible to defects due to modulation of the overlay.

12. The method of claim 11, further comprising determining an impact of the modulation of the overlay on the points in the design that are most susceptible to the defects.

13. The method of claim 1, further comprising determining one or more characteristics of one or more reticles used in the double patterning lithography process based on the defects.

14. The method of claim 1, further comprising altering one or more parameters of the double patterning lithography process based on the defects.

15. The method of claim 1, further comprising altering one or more parameters of a control process used for the double patterning lithography process based on the defects.

16. The method of claim 1, further comprising altering one or more parameters of a design for the multiple die based on the defects.

17. The method of claim 1, further comprising comparing two or more of the images acquired for the multiple die printed at the nominal values to each other and detecting defects in the multiple die printed at the nominal values based on results of said comparing the two or more images acquired for the multiple die printed at the nominal values to each other.

18. The method of claim 1, further comprising performing metrology on one or more of the multiple die, determining overlay errors, focus errors, dose errors, or some combination thereof of the double patterning lithography process based on results of the metrology, and simulating one or more characteristics of a device being formed from the one or more multiple die by applying the overlay errors, focus errors, dose errors, or some combination thereof to design data for the one or more multiple die.

19. The method of claim 1, wherein said acquiring comprises acquiring the images for the two or more die printed at the nominal values by simulating how the two or more die would be printed on the wafer at the nominal values.

20. The method of claim 1, wherein the images for the two or more die printed at the nominal values comprise simulated images acquired from a computer-readable storage medium.

21. A method for predicting one or more characteristics of a device being formed on a wafer, comprising:
performing metrology on one or more die formed on a wafer using a lithography process;
determining overlay errors, focus errors, dose errors, or some combination thereof of the lithography process in the one or more die based on results of the metrology; and
simulating one or more characteristics of a device being formed from the one or more die by applying the overlay errors, focus errors, dose errors, or some combination thereof to design data for the one or more die, wherein said determining and said simulating are performed using a computer system.

22. The method of claim 21, further comprising determining a sensitivity of the one or more characteristics of the device to the overlay errors, focus errors, dose errors, or some combination thereof.

23. The method of claim 21, further comprising determining one or more positions of one or more metrology targets to be formed on other wafers using the lithography process based on sensitivity of the one or more characteristics of the device to the overlay errors, focus errors, dose errors, or some combination thereof.

24. The method of claim 21, further comprising dispositioning the wafer based on the one or more characteristics of the device.

25. The method of claim 21, wherein said simulating comprises re-sizing individual polygons in the design data based on the overlay errors, focus errors, dose errors, or some combination thereof to determine areas in the design data that may have one or more failure mechanisms due to the overlay errors, focus errors, dose errors, or some combination thereof.

26. The method of claim 21, further comprising predicting yield of a fabrication process that includes the lithography process based on the one or more characteristics of the device, wherein predicting the yield is performed in-line.

27. The method of claim 21, further comprising determining a sampling scheme for the wafer based on the one or more characteristics of the device, wherein determining the sampling scheme is performed in-line.

28. The method of claim 21, further comprising determining one or more parameters of an inspection process to be performed on the wafer or other wafers on which the lithography process is performed based on the one or more characteristics of the device.

29. The method of claim 1, further comprising determining one or more parameters of a metrology process to be performed on the wafer or other wafers on which the lithography process is performed based on the one or more characteristics of the device.

30. The method of claim 21, wherein said simulating comprises simulating the one or more characteristics of the device by determining overlay correctables, focus correctables, dose correctables, or some combination thereof from the overlay errors, focus errors, dose errors, or some combination thereof, respectively, and applying the overlay correctables, focus correctables, dose correctables, or some combination thereof to the design data for the one or more die.

31. The method of claim 21, further comprising determining a process window for the design data based on the one or more characteristics and the overlay errors, focus errors, dose errors, or some combination thereof.

32. The method of claim 21, further comprising determining a rework strategy for the wafer or other wafers on which the lithography process is performed based on the one or more characteristics and the overlay errors, focus errors, dose errors, or some combination thereof.

33. The method of claim 21, further comprising determining one or more areas in the design data at which the overlay errors, focus errors, dose errors, or some combination thereof are more critical for the one or more characteristics of the device.

34. The method of claim 21, further comprising applying a local model of overlay, dose, and focus to at least one of the one or more areas.

35. The method of claim 34, further comprising comparing results of said applying the local model to results of applying a global model of overlay, dose, and focus to the design data to determine an accuracy of the global model.

36. The method of claim 1, wherein the lithography process is a double patterning lithography process, wherein said performing the metrology is performed after a first patterning step of the lithography process, and wherein the method further comprises determining one or more parameters of a second patterning step of the lithography process based on the overlay errors, focus errors, dose errors, or some combination thereof.

37. The method of claim 21, wherein the lithography process is a double patterning lithography process, wherein the one or more die comprise two or more die printed at nominal values of overlay and one or more die printed at modulated values of the overlay, and wherein the method further comprises acquiring images of at least one of the two or more die printed at the nominal values of the overlay and at least one of the one or more die printed at the modulated values of the overlay, comparing the images acquired for the at least one of the two or more die printed at the nominal values of the overlay to the images acquired for the at least one of the one or more die printed at the modulated values of the overlay, and detecting defects in the one or more die printed at the modulated values based on results of said comparing.

* * * * *